Dec. 27, 1932.  C. H. LEIS  1,892,555
METHOD OF FABRICATING SHEET METAL BEARINGS
Filed Aug. 19, 1931
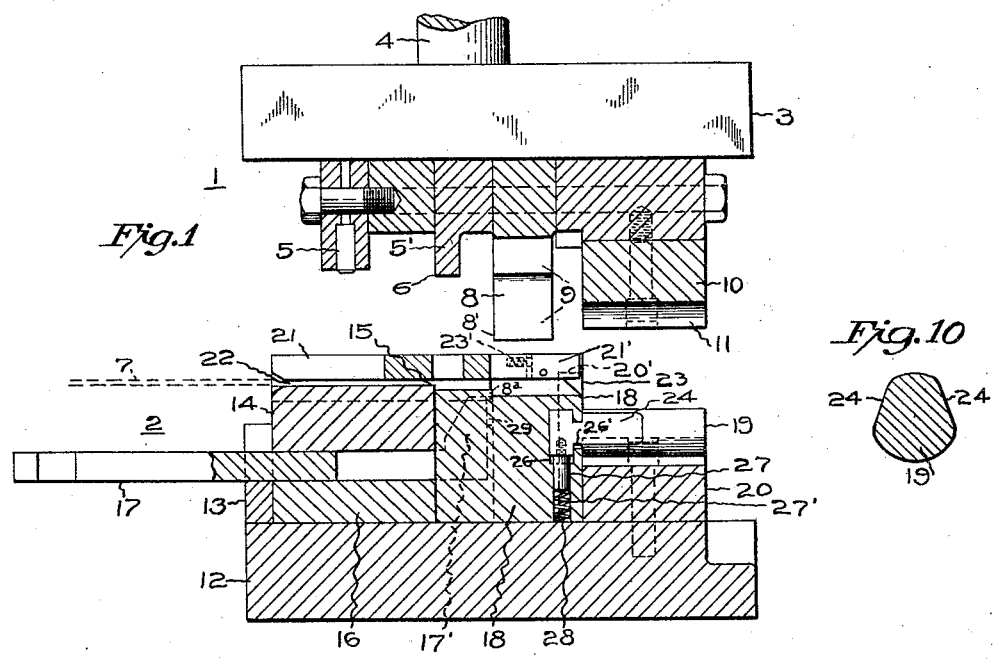
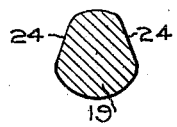
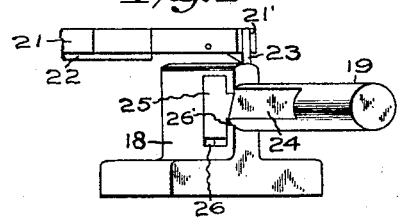
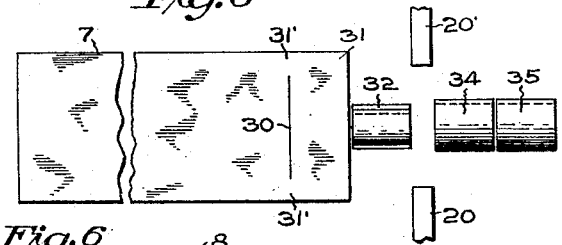
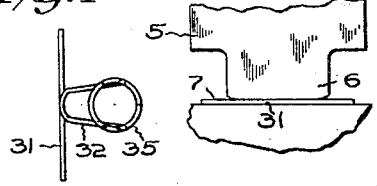
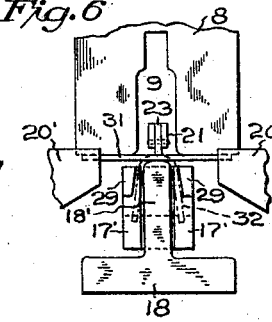
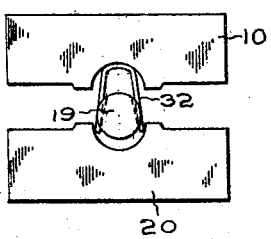
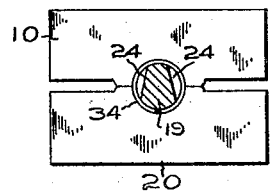
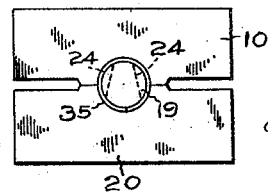
Inventor
Carl H. Leis
By Richard S. Harrison
His Attorney Patented Dec. 27, 1932

1,892,555

UNITED STATES PATENT OFFICE

CARL H. LEIS, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA

METHOD OF FABRICATING SHEET METAL BEARINGS

Application filed August 19, 1931. Serial No. 558,060.

My invention relates to method of and dies for same in the fabrication of sheet metal bearings, relating in particular to progressively forming split bushings from a blank strip of rolled sheet metal.

Various methods of fabricating sheet metal bearings are practiced, common among which is, briefly stated, to provide a strip of rolled sheet metal having a greater width than the length of the finished bearing made therefrom, feed the same in step-by-step order into a progressive-die mechanism where the blank is first reduced in width longitudinally, for a predetermined distance, by shearing its edge or edges, advance same and slightly bend the ends thereof, then further advance same to partially sever it transversely from the edges inwardly, leaving it intact with the strip at the center; then advance same to be preliminarily bent into a substantially U shape or channel, then further advance it to its next bending step, then still further advance same completely severing it from the strip and at the same time finally pressing same into its finished sleeve formation over a reciprocable mandrel inserted therein.

In reducing the width of the strip blank by shearing from the edge or edges before forming, there is considerable waste of material in the form of scrap cuttings, as in every bushing made the edges are trimmed. Furthermore, there are occasions during the formation steps that the partly sheared blank, and succeeding forms still partly intact therewith, become slightly out of line with the reciprocable mandrel, owing to the weakened initial transverse shearing of the strip from the edges inwardly, leaves but a very small uncut portion of metal at the center between the sheared portions for final severance. When such misalinement occurs, the mandrel or core fails to properly enter the partly formed blank, resulting in imperfect formation of such parts, requiring discontinuance of operation and the discarding of all parts included in the steps of formation.

It is one of the objects of my invention to provide a method wherein the bearings are formed from a continuous strip of metal of substantially the same width as that of the bearing circumference, thus dispensing with trimming the edges and therefore effecting a saving in material.

Another object is to provide a method wherein perfect alinement of the strip material, the blank and the succeeding shapes of the bearing development therefrom are maintained, thus avoiding any possibility of having to cease operation, remove and discard a strip of metal in imperfect stages of formation.

Further objects are to provide a method and apparatus for making such bearings wherein the same can be made rapidly and in perfect form.

In the accompanying drawing I have shown a preferred embodiment of an apparatus for carrying out my improved method and have also illustrated the steps in said method.

Referring to said drawing:

Figure 1 is a sectional side elevation of the apparatus.

Figure 2 is a schematic view of certain assembled parts employed in the formation of the bearings.

Figure 3 is a diagrammatic plan view illustrating the manufacture of a bushing from a stock strip of metal.

Figure 4 is an end view thereof.

Figure 5 illustrates the initial step of shearing.

Figure 6 illustrates the step of final shearing and initial bending.

Figure 7 illustrates the beginning of the next or intermediate step in forming the bushing.

Figure 8 illustrates the finishing of said intermediate forming step.

Figure 9 illustrates the final step of forming the bushing.

Figure 10 is an enlarged cross sectional view through the flattened portion of the forming core.

The apparatus comprises an upper reciprocal die member 1 and a lower fixed companion die member 2.

The upper member comprises in part a holder plate 3 having a stem 4 adapted to be secured to a vertically reciprocative member of a suitable press.

The plate carries a stamp 5, unimportant: an initial shearing member part 5: having its free or cutting end 6 reduced to a predetermined length, transversely, to less than that of the strip 7 from which the bearings are made; a preliminary combined shaping die and shearing part 8, and a shaping die part 9.

The preliminary forming die part 8 is bifurcated at its operating end 8 by having an opening 9 therein and also functions as part of a final shearing means, as will be later set forth. The shaping die part 10 is of dual length, the groove 11 therein being of semicircular form and is adapted to function, owing to its length, as parts of both the intermediate and the final shaping dies.

The lower die member 2, includes a base plate 12, with an attached back-up plate 13, and initial shearing plate part 14 of which the edge 15 is the cutting edge: the die holder 16; the reciprocable feed finger 17 having bifurcated upstanding ends 17, the preliminary forming die part 18 for coacting with the die part 8 of the upper die member, and of which the upstanding portion 18 is the active part: the final forming core 19: the lower intermediate and final forming die part 20, which is of like length and cooperates with the upper dual die part 11, the abutments 20; the stripper plate 21 having an extension 21 thereon and provided with a groove 22 at its underside through which the strip 7 is inserted and is adapted to advance in step-by-step order to the operating mechanism by any suitable automatic means, not shown.

The extension 21' of the stripper plate is bifurcated at its end and has pivoted therein a pawl 23 which is held in normal engagement with the upper end of the preliminary forming die part 18 by a spring 23', the purpose of which will be later set forth.

The forming core 19 is of vertical floating type, being cylindrical at its outer end portion and flattened on opposite parallel sides 24, on the intermediate forming portion and terminating in a T shape at its extreme inner end 25 where it is slidably fitted within a correspondingly formed opening in the preliminary bending die part 18, there being slight play spaces 26 and 26' at the lower end of said opening to permit a correspondingly downward movement of the core during formation of bushings thereabout, said flattened portion being tapered on downwardly diverging lines provides a broad base. The core is held in place by means of the pin 27 carried thereby and operable within an opening 27'; there being a spring 28 within said opening to hold in and return the core to its normally elevated out-of-center position.

The ends of the bifurcated portion of the feeding finger 17 are provided with tapered lugs 29, the purpose of which is to prevent any possible rocking or accidental positioning of the preliminary bent blank or channel as will be best understood by reference to Fig. 6 during advance to its next succeeding step by the inward movement of said finger.

In describing the progressive steps of operation, I shall confine same to that of making a single bearing from the first step of forming the initial shearing of a blank from the stock strip to that of the finished cylindrical bearing, it being understood that the operation is continuous, that is to say that, while the first or one bearing is undergoing its second step that the following one is undergoing its initial step, etc. throughout the steps as long as stock is supplied to the apparatus, or operation thereof is continued.

Operation

In operation, the stock strip 7, which usually is of considerable length, and of a width substantially that of the circumference of the bearing to be made, is automatically fed into the apparatus, through the slot 22 of the lower member 2, by suitable mechanism, not shown, until the end thereof engages a temporary stop, not shown, said stop being employed only at the beginning of operation.

Upon lowering of the upper member 1, the shear 6 forms a cut 30 across the middle portion of the strip, at the lower shearing edge 15, leaving the preliminary blank 31 unsevered or intact with the strip at 31; which cut constitutes the first step in the method.

The upper member then ascends to its former position during which the strip 7 is advanced until the end thereof engages the stops 20, see Fig. 6.

When the upper member again descends, the cut 30 will be in exact line with the shearing edge 8' and the portion 31 be severed by the shearing edge 8' of the preliminary forming die 8, thus completing the final shearing of the blank from the strip. Upon further descent of the member 1 the blank being engaged by die part 8, said blank is pressed into its initial bent channel form over die part 18.

The finger 17 which is adapted to move in synchronism with the upper die member 1, by suitable mechanism, not shown, advances the channel form to its intermediate forming position over the flattened portion of the core 19 before the said member 1 has sufficiently descended to cooperate with the member 2, said finger having returned to its position of rest, as shown in Fig. 1, following its advance of the channel.

On the next downward movement of the member 1, the die 11 engages the channel or U shaped blank which cooperating with the lower die 20, causes said blank to be pressed about the flattened portion 24 of the core into its intermediate or unsized cylindrical form 35, as shown in Figs. 3, 4, and 8, thus completing the next succeeding step.

On the next downward movement of the member 1, the next succeeding channel shaped form being pushed over onto the flattened portion of the core by the finger, engages the intermediate cylindrical formed one and forces the same over onto the cylindrical portion of the core, so that the dies 11 and 20 on coming together forms the same about the core into a complete sized bearing of true cylindrical form, this being the final step in the method.

In shaping the channel or U shaped member into a substantially circular or into its intermediate form, and in its final step into the finished or sized form, about the core and between the dies, the said core, being yieldably held above center, moves downwardly by reason of the pressure exerted thereon in forming the cylinder within the dies, to a true central position with respect to said dies, as permitted by the spaces 26 and 26′, resuming its upward normal position when the member 1 has begun its ascent. By this means the bearings under compression of the dies, 11 and 20, is relieved of frictional contact with the die 20, permitting it being readily pushed off the core in its finished form by advance of the next succeeding form coming into its finishing position.

As will be readily apparent the final shearing of the blank occurs immediately preceding that of its bending into the channel or U shape having straight side walls, and as the die 8 in performing the final shearing, is then in engagement with the sheared blank resting upon the upper end of the preliminary forming die 18, there is then a three point contact, making it impossible for the blank to become displaced and permit the same being bent into other than a perfect channel U shape. Furthermore, the blank after being formed into such channel shape, is held by the lugs 29 at the finger end from shifting its position laterally, and is further held from backward displacement, when advanced upon the flattened portion of the core 19, by means of a spring actuated pawl 23 pivoted on the extension 21′ of the plate 21.

By forming the side walls 24 of the core on downwardly diverging lines, gives a broad under working surface thereto relative to the top portion, all corners being rounded, as shown more particularly in Fig. 10, so that when the channel is in position thereupon, as shown in Fig. 7, the pressure of the upper die in its downward movement will cause the lower portions of the channel sides to slidably move and curve inwardly between the underside of the core and lower die, thus conforming to the die. At the same time, during descent of the die, the upper portion of the channel will spread and be compressed in conformation to the upper die, the whole resulting in a substantially true cylindrical bearing. By preventing any displacement of the channel during its advance to the core 19 by the finger 17, and by having said core maintained at all times in fixed longitudinal position, it will be apparent that imperfection in any of the several forms acted thereon, due to misalinement, is entirely eliminated.

While I have shown and described a specific embodiment of the apparatus, and the steps in the method of forming the bearing, I desire that the same be regarded as illustrative only, and that the appended claims be accorded the broadest construction consistent with the prior art.

What I claim is:

1. A method of progressively forming sleeve bearings from a strip of sheet metal, which consists of partly shearing the blank from the strip, then completely shearing the blank from the strip and bending the same into a channel form in the same operation, and then bend the channel into a tubular sleeve bearing.

2. A method of progressively forming sleeve bearings from a strip of sheet metal, which consists of partly shearing the blank from the strip, then completely shearing the blank from the strip and bending the same into a channel form in the same operation, then bending the channel into tubular form, and then finish bending the same into a sized tubular bearing sleeve.

3. A method of forming progressively sleeve bearings from a strip of sheet metal, which consists of partly shearing the blank from the strip transversely leaving it intact with the strip at the edges, then shearing the blank from the strip at its intact portion and in the same operation bending the blank into a channel, then bend the channel into a tubular sleeve bearing.

4. A method of progressively forming sleeve bearings from a strip of sheet metal, which consists of first partly shearing the blank from the strip transversely leaving it intact with the strip at the edges, then shearing the blank from the strip at its intact portions and in the same operation bend the blank into a channel, bend the channel into a preliminary tubular form, and then form the same into a sized tubular bearing.

In testimony whereof I affix my signature.

CARL H. LEIS.